3,248,314
ORGANOCLAY-POLYMER COMPOSITIONS
Paul G. Nahin, Brea, Calif., assignor to Union Oil Company of California, Los Angeles, Calif., a corporation of California
No Drawing. Filed Mar. 14, 1960, Ser. No. 14,533
12 Claims. (Cl. 204—158)

This invention relates to improved synthetic plastic materials and comprises a method for incorporating clays into thermoplastic vinyl polymers.

Thermoplastic vinyl polymers derived from the polymerization of vinyl monomers such as ethylene, styrene, vinyl chloride, methyl methacrylate, etc., are considerably more expensive than naturally occurring minerals such as clay. Clays have been added to these polymers as fillers to reduce their cost; however, the desirable physical properties of the polymer are often impaired by clay addition.

It is a purpose of this invention to decrease the cost of vinyl polymers by incorporating mineral clays into the polymer. It is an additional purpose of the invention to incorporate clays into vinyl polymers while maintaining or improving their physical properties.

The aforementioned purposes are achieved by the invention which consists of forming an organoclay adduct from clay and a polymeric organic addend, then incorporating the adduct in the vinyl polymer and, finally subjecting the mixture to ionizing radiation. By this procedure, substantial amounts of clay, up to 80–90 weight percent, can be incorporated in vinyl polymers, and the irradiated products are found to have equivalent or improved physical properties as compared to the pure vinyl polymer. The particular group of polymeric organic addends employed are polyethylene oxide, polyvinyl alcohol and poly(dimethylsiloxane). Of the compositions produced by this procedure, I have discovered one having a completely unexpected and unusual black appearance. This composition, which is very suitable as a substitute for carbon black filled polymers, comprises polyethylene and the clay adduct prepared from polyvinyl alcohol and montmorillonite. This black appearance is unique to this composition and is obtained from components which are themselves white or buff in appearance.

The vinyl polymers which are modified by irradiation with organoclay adducts in accordance with the invention are those derived by addition polymerization of vinyl unsaturated monomers. These polymers are relatively saturated compounds having a low chemical activity. When, however, these polymers are subjected to irradiation they cross link with the liberation of gases comprising chiefly hydrogen with lesser amounts of methane, ethylene, etc. The degree of this cross linking is generally reflected in improved properties of the polymer, such as greater solvent resistance and tensile strength. I have now found that when an organoclay adduct having an organic addend selected from the group of polyethylene oxide, polyvinyl alcohol and poly(dimethylsiloxane) is incorporated in the polymer and the mixture irradiated, the final product has properties which are even more improved than are the properties of the pure polymer which has been subjected to equal radiation. Typical of the improved physical properties are the greatly improved solvent resistances of the irradiated organoclay-vinyl polymers which are much more resistant to solvents than is the pure vinyl polymer which has been subjected to equal irradiation. This increase in solvent resistance evidences the chemical bonding of the vinyl polymer to the organic addend of the organoclay adduct. No such bonding occurs in the absence of irradiation, for solvent extraction of an unirradiated mixture of the organoclay adduct and vinyl polymer results in disintegration of the sample with clay particles being found as sediment in the solvent. Such clay sediment has never been observed when extracting a vinyl polymer which has been bonded by irradiation to an organoclay.

Typical of the vinyl polymers suitable for use in the invention are those prepared from the following monomers: olefins such as ethylene, propylene, butylene, isobutylene, pentene, butadiene, isoprene and the like; hydrocarbon substituted olefins such as styrene having an appendant phenyl group; and olefins having non-hydrocarbon substituents such as vinyl and vinylidine chloride having one and two appendant chloride atoms; methyl acrylate, methyl methacrylate and allyl acetate having appendant ester groups; and acrylonitrile and methacrylonitrile having appendant cyano groups. Any of the polymers derived by homo or copolymerization of the aforementioned monomers can be reduced in cost and have its mechanical properties improved by bonding to clay or organoclays in accordance with the invention. Branched or linear chain polymers having melting points below about 400° C. and molecular weights between about 5,000 and 200,000 are suitable for use in the invention; those having molecular weights between about 10,000 to 80,000 being preferred.

The clays suitable for use in the invention comprise in general any of the natural alumino-silicates which exhibit base exchange properties. The two principal subdivisions of natural clays are the bentonites and the kaolins. The bentonite clays, as found in nature, contain a high proportion of the montmorillonite type minerals such as motmorillonite, beidellite, nontronite, hectorite, saponite, sauconite, etc. Montmorillonite is often characterized as $(Al_2O_3 \cdot 4SiO_2 \cdot H_2O + xH_2O)$. The kaolin clays are rich in kaolin minerals including kaolinite

$$(Al_2O_3 \cdot 2SiO_2 \cdot 2H_2O)$$

dickite, nacrite, anauxite and halloysite. Kaolin clays are usually found to contain between about 30 to 40 percent $Al_2O_3$, while bentonite clays usually contain less than 20 percent thereof. Another important characteristic of bentonite clays is their high cationic base-exchange capacity, commonly running between 80 and 100 milliequivalent per 100 grams of air-dried clay. Kaolin clays on the other hand show a low cationic base-exchange capacity in the order of 2–10 me. per 100 grams of dry clay. X-ray crystallography shows the montmorillonite minerals to have three-layer lattices while kaolin minerals have a two-layer crystal lattice. Differential thermal analysis curves for montmorillonite show three endothermic peaks at 150–320°, 695–730° and 870–920° C., and one exothermic peak at 925–1050° C. Similar curves for kaolinite show a strong endothermic peak at 620° C. and a strong exothermic peak at 980° C. which sharply differentiate it from other clay mineral groups.

The bentonite clays can be divided into two general categories, the swelling and nonswelling types. The latter occurs in many widely separated areas including Arizona, California, Texas, Arkansas, Mississippi, Kentucky, Tennessee and many foreign countries. Swelling type bentonites are found in Wyoming, South Dakota, Montana, Utah, Nevada and California. Of this type, it is preferred to employ herein the type of swelling bentonite such as is found in Wyoming where it occurs in a high degree of purity. The montmorillonite and kaolinite type clays are in general preferred, although other clays can be employed provided they have sufficient base-exchange capacity, i.e., at least about 1 me. per 100 grams.

The clay is usually found in a form wherein the base-exchange sites are occupied by alkali or alkaline earth metals, and as such it is not suited for the preparation of the organo-clay adduct needed for the invention. To adapt the clay for use, it should first be converted to the hydrogen form by replacing the alkali or alkaline earth metals with hydrogen ions. This can be accomplished by any suitable means, e.g., by leaching the clay with a strong mineral acid such as sulfuric, nitric, hydrochloric, etc., or by contacting aqueous suspensions of the clay with a cation exchange resin such as Amberlite IR–120. The resultant acid clay, e.g., hydrogen kaolinite or montmorillonite, is then ready for adduction with the polymeric organic addend as hereinafter described.

The organic addends employed are themselves polymerized compounds having molecular weights between about a few thousand to several million and having a structure such that they are adsorbed or chemically bonded to the clay surface. These polymers have recurring attractant centers for the clay surface along their chain and are therefore able to bond or adsorb to the active sites on the clay surface without steric hindrance. Additionally, these organic addends have methylene groups which are available for cross-linkage to the vinyl polymer upon irradiation. The specific polymeric addends suitable for use in the invention are: poly(dimethylsiloxane), polyvinyl alcohol and polyethylene oxide. Of these, the polyvinyl alcohol is attached to the hydrogen sites of the clay surface by hydrogen bonding through the recurring hydroxyl radical while the polyvinyl silicones and polyethylene oxide are strongly adsorbed on the hydrogen-clay surface.

The organoclay adducts are prepared by first dissolving the organic addend polymer in a suitable solvent; water is preferred for polyvinyl alcohol and polyethylene oxide, and toluene is preferred for poly(dimethylsiloxane). This solution is then added with stirring to an aqueous suspension of the hydrogen clay. The resultant system is dried at about 60 to 250° C. In general, it is desirable to employ the addend in amounts between about 0.1 and about 20 weight percent of the clay, with between about 0.5 and about 15 weight percent being preferred. These amounts correspond to the stoichiometric ratio of polyvinyl alcohol which chemically bonds to the clay and to the amount of poly(dimethylsiloxane) and polyethylene oxide readily adsorbed by the clay. Use of greater amounts than that which is chemically bonded or adsorbed to the clay gives no added advantage.

After the organoclay adduct has been prepared, it is mixed with the vinyl polymer in any suitable conventional manner such as by milling, grinding, fusing or with the aid of a solvent or dispersing agent. Thus the vinyl polymer and the finely divided organoclay adduct can be thoroughly ground together in a Banbury mixer or ball mill. Alternatively, the vinyl polymer can be melted and the organoclay adduct stirred into the melt which is then allowed to cool and harden. Solvents for the polymer, e.g., hexane, petroleum ether, kerosene, can be used to dissolve the vinyl polymer and to provide a liquid system into which the organoclay adduct can be stirred. The mixture can then be cooled and/or evaporated to coprecipitate the vinyl polymer and the organoclay adduct. Alternatively, an emulsifiable vinyl polymer can be dispersed in water and co-flocculated with the organoclay adduct. The choice of any of the aforementioned techniques is within the skill of art and dependent on the physical properties of the particular vinyl polymer employed, e.g., relatively brittle polymers such as polystrene and polyvinylidene chloride are not well suited for the grinding technique and are therefore mixed with the organoclay adduct by either dissolving or melting the polymer.

The proportion of organoclay adduct to be added to the vinyl polymer can vary over a wide range dependent on the ultimate use of the product. For uses requiring little flexibility, large proportions of organoclay adduct can be used, e.g., up to about 80 weight percent. Compositions containing from about 50 to about 80 weight percent of organoclay adduct can suitably be used to fabricate rigid articles such as doors, floor title, wall boards, building blocks, etc. When it is desired to retain a considerable amount of flexibility in the finished article, lower proportions should be employed, e.g., between about 5 to 50 weight percent.

The vinyl polymer and organoclay adduct mixture can be fabricated into any desired shape by conventional means such as molding, extruding, laminating, etc., and thereafter irradiated to chemically bond the vinyl polymer to the organoclay adduct. Generally, the fabrication is performed before irradiation while the mixture is still thermoplastic. In some instances, the mixture is only mildly irradiated and is still sufficiently thermoplastic to permit shaping after irradiation. A particular technique, well suited for use in the invention, comprises the irradiation of the clay before it is mixed with the vinyl polymer, either when it is in the clay or the organoclay adduct form with particle or electro-magnetic radiation. The clay solids absorbs a substantial portion of this radiation which can subsequently be released by heating. The resultant organoclay adduct containing stored releasable radiant energy is then mixed with the polymer, and the mixture is fabricated into the desired shape as previously described. During the fabrication step or shortly thereafter the mixture is heated to above about 60° C., the upper limit being limited only by the thermal stability of the composition which is generally about 400 to about 500° C., and at this temperature the stored radiant energy is released to cause the polymer to chemically bond to the organoclay adduct.

The radiation step is performed with techniques now conventional in the art, all of which involve placing the article into a field of high energy radiations. The radiation can be gamma rays, beta rays, alpha rays and combinations thereof. Ordinarily it is preferred to employ gamma and/or beta radiations because of their greater penetrating power and ready availability from present day nuclear sources. Suitable sources of radiation include for example radioactive isotopes produced by neutron bombardment in a nuclear pile, fission products from nuclear piles, spent fuel elements from nuclear reactors, radioactive isotopes produced by bombardment in particle accelerators and the emanations themselves from particle accelerators, electron generators and the like. Any effective ionizing radiation, however produced, can be employed. Suitable sources of radiation include, for example, metallic concentrates of one or more of the following isotopes: $Ca^{45}$, $Ce^{144}$, $Cs^{137}$, $Sr^{89}$, $Co^{60}$, $Sc^{46}$, $Y^{90}$.

Where the mass of polyolefin-adduct mixture is large and concentrated, it is preferred to employ gamma radiations because of their greater powers of penetration. Beta rays and alpha rays have relatively shorter ranges in solid materials, and are hence usable herein only where the polyolefin-adduct mixture is treated in attenuated form, as for example filaments or thin sheets. If beta radiations are employed it is preferred to use high energy radiations in the range of about 0.5 to 4.0 mev.

It is conventional in radiation technology to define operative radiation dosages in terms of the amount of energy absorbed per gram by the material being irradiated. A conventional measure of such energy absorption is the megarad (1,000,000 rads, 1 rad being equivalent to 100 ergs per gram of material irradiated). For purposes of the present invention, dosages ranging between about 1 and 1000 megarads may be employed and preferably between about 5 and 200. The optimum dosage depends upon the initial molecular weight of the polyolefin and the degree of cross linking desired in the final product. Dosages in the high ranges are preferred where highly rigid, highly cross-linked structures are desired, and/or where the original polyolefin was of low molecular weight, e.g. below about 20,000. Conversely, where a more flexible product is desired and/or where high molecular weight polyolefins are used, dosages in the lower ranges specified will usually be employed. The precise dosage to be used hence will depend on the desired product specifications and raw materials, and can readily be determined experimentally.

Ordinarily the radiation is carried out in air at normal room temperatures, but other environments and temperatures may be employed, and specifically air can be excluded and the temperatures can range between about −50° and 200° C. Those skilled in the art will understand that any treating unit containing a source of radiation must be handled with due care, and adequate shielding of lead or concrete provided in order to protect the operator.

The following exemplified procedure is cited to illustrate certain applications of the invention but is not intended to be limiting in scope.

A sample of pure hydrogen montmorillonite was prepared as follows:

A 2 percent aqueous suspension in distilled water of a Wyoming bentonite having a particle size range of about 0.05 to 2.0 microns and a base exchange capacity of 100 me. per 100 grams was prepared and percolated first through a bed of ammonium-charged cation exchange resin (Amberlite IR–120) to exchange ammonium ions for the lattice exchange cations of the clay. Naturally present adsorbed salts on the clay were also leached out and removed from the clay as dissolved ammonium salts. The resulting montmorillonite suspension was then percolated through a bed of anion exchange resin (Amberlite IRA–400) to convert dissolved ammonium salts to ammonium hydroxide. The effluent from this treatment was finally percolated through a bed of hydrogen exchange resin (IR–120) to convert the ammonium montmorillonite to hydrogen montmorillonite, and to neutralize the ammonium hydroxide in solution. The product suspension was allowed to settle overnight and then the clear supernatant liquid was removed by syphon. The settled suspension was filtered, dried with hot air and powdered in a high speed pulverizer. The resultant hydrogen montmorillonite had the following analysis:

*Table 1*

Calcium oxide, weight percent _____ 0.08
Nitrogen [1], weight percent _____ 0.432
Base exchange capacity, me. per 100 grams _____ 67.8
Hydrogen exchange capacity, me. per 100 grams 29.3

[1] This nitrogen content resulted from incomplete replacement of the ammonium ions since the ion exchange was conducted only to provide sufficient hydrogen centers on the clay as to combine with or attract the addend molecules. Complete replacement of the ammonium ion can of course be practiced, if desired.

This hydrogen montmorillonite product was employed to prepare adducts with poly(dimethylsiloxane), polyvinyl alcohol and polyethylene oxide in the manner hereinafter described.

Poly(dimethylsiloxane) montmorillonite was prepared from hydrogen montmorillonite and a poly(dimethylsiloxane), Dow-Corning Silastic S–2054, containing 4 mole percent of vinyl siloxyl in the polysiloxane chain and a molecular weight between about 0.5 and 2.5 million. The poly(dimethylsiloxane) was dissolved in toluene at a concentration of 4 grams per 100 milliliters. The aforedescribed hydrogen montmorillonite was dispersed in water at a concentration of 19.6 grams per liter. The poly(dimethylsiloxane) solution was then added to the clay dispersion with stirring and the product was dried on steam rolls. The content of poly(dimethylsiloxane) in the final product was 6.9 weight percent.

The polyvinyl alcohol montmorillonite adduct was prepared by dissolving 30 grams of polyvinyl alcohol having an average molecular weight between about 100,000 and 500,000 in 3 liters of distilled water. This solution was added to a hydrogen montmorillonite suspension at a volumetric ratio of 1:8 to produce an aqueous system which was dried on steam rolls. The content of the polyvinyl alcohol based on a carbon analysis was 2.75 weight percent.

The polyethylene oxide montmorillonite adduct was prepared by dissolving 20 grams of polyethylene oxide having an average molecular weight between about 1 and 4 million in 2 liters of water by shaking overnight. This solution was added to a hydrogen montmorillonite suspension at a volumetric ratio of 1:10. This product was filtered overnight, dried on steam rolls and powdered in a high speed pulverizer. The polyethylene content of the adduct based on the carbon analysis was 2.57 weight percent.

Fifty parts by weight of each of the aforedescribed organoclay adducts were then blended with 50 parts of preheated polyethylene on a 2-row steam-heated mill. The samples were molded in a molding cycle consisting of a 2-minute preheat at no applied pressure, 5 minutes at 982 p.s.i.g., and finally 1,339 p.s.i.g. for 10 minutes. The resulting molded sheets were 0.1 inch thick and from these sheets smaller sheets approximately 6″ x 2¾″ were prepared and subjected to irradiation. The irradiation conditions in a commercial electron generator were: 7.5 megarads per pass at a conveyor speed of 40 inches per minute at 2 m.e.v. (million electron volts), and 2 milliampere beam-out current.

The irradiated products were analyzed for tensile strength and solvent resistance in accordance with the following test procedures: The tensile strength was determined by ASTM test D412–51T. The solvent resistance of the samples was determined by placing a weighed portion of the sample which had been dried to constant weight in a stainless steel wire basket and placing the basket in an electrically heated Soxhlet extractor containing reagent grade toluene at a temperature of 110° C. At the end of the 24-hour period the samples were withdrawn and dried to constant weight under reduced pressure in a nitrogen swept oven, the weight loss therefrom indicating the fraction dissolved.

The results from this series of tests appear in the following Table 2:

*Table 2*

| Sample No. | Organic Addend | Composition, Wt. Percent | | | Irradiation Megarads | Wt. Percent Dissolved | Tensile Strength (p.s.i.) |
| --- | --- | --- | --- | --- | --- | --- | --- |
| | | Addend | Clay | Polyethylene | | | |
| 1 | None | 0 | 0 | 100 | 55 | 19.6 | 1,534 |
| 2 | Polyvinyl alcohol | 1.38 | 48.62 | 50 | 55 | 3.0 | 2,114 |
| 3 | Poly(dimethylsiloxane) | 3.5 | 47.5 | 50 | 55 | 3.5 | 1,505 |
| 4 | Polyethylene oxide | 1.24 | 48.76 | 50 | 55 | 4.4 | 2,024 |

From this table it can be seen that the addition of an organoclay adduct to a vinylpolymer with irradiation produces a product having a much greater solvent resistance than the pure polymer which has been subjected to the same irradiation. The table also shows that substantially the same or even greater tensile strengths can be obtained from organoclay adduct filled polymers than from the pure polymer after irradiation.

The great improvement in solvent resistance of the organoclay adduct bonded polymer after irradiation is due to the cross linking of the polymer to the organic portion of the organoclay adduct. Thus the clay is chemically bonded or strongly attached to the organic addend (polyvinyl alcohol, poly(dimethylsiloxane), or polyethylene oxide) and the organic addend in turn is chemically cross-linked to the vinyl polymer by the irradiation. The resultant organoclay polymer is highly insoluble in solvents which normally have high solvent power for the polymer.

Use of kaolinite clay rather than montmorillonite has been found to show an increase in average tensile strength of the irradiated compositions of about 430 p.s.i. The use of kaolinite rather than montmorillonite has also been found to decrease the solvent resistance slightly an average increase in the weight percent dissolved by about 0.35 having been observed. Use of a higher molecular weight vinyl polymer; polyethylene of about 64,000 units; increases the average tensile strength reported in Table 2 by about 1300 p.s.i., and increases the average weight percent dissolved by about 1.39 units.

I have observed that the organoclay addend-vinyl polymer which consists of polyvinyl alcohol montmorillonite as the organoclay and polyethylene as the vinyl polymer is very black in appearance. This is very unusual since the polyethylene is pale white, polyvinyl alcohol is a white powder and montmorillonite has a buff color. The organoclay addend of 2.75 weight percent polyvinyl alcohol and hydrogen montmorillonite is grey. When these materials are mixed and molded, however, a very black product is obtained which is valuable for outdoor use where the black appearance would protect the polyethylene from ultraviolet light degradation. In addition to this desirable black appearance, the organoclay polyethylene can be irradiated to achieve a final product which has a very high resistance to solvents.

Other organoclay addends, vinylpolymer compositions which are similarly improved by irradiation at 50–200 megarads, include the following:

*Table 3*

| | Organoclay Adduct | | Vinyl Polymer, Weight percent |
|---|---|---|---|
| | Clay, Weight percent | Addend, Weight percent | |
| 1 | Bentonite, 67% | Polyvinyl alcohol, 3% | Polystyrene, 30%. |
| 2 | Kaolin, 70% | Polyethylene oxide 5% | Polymethylmethacrylate, 25%. |
| 3 | {Kaolin, 20%<br>{Bentonite, 30% | }Poly(dimethylsiloxane), 7% | Polyvinyl chloride, 43%. |
| 4 | Bentonite, 15% | Polyvinyl alcohol, 1% | Polyisobutylene, 84%. |

As will be apparent to those skilled in the art, many other analogous compositions may be prepared by the methods herein disclosed. The foregoing description is not intended to be limiting in scope except where stated; modifications obvious to those skilled in the art are intended to be included. The true scope of the invention is intended to be defined by the following claims.

I claim:
1. A method for incorporating clay into a vinyl polymer which comprises forming an organoclay adduct by contacting a hydrogen clay with an organic addend selected from the group consisting of polyvinyl alcohol and polyethylene oxide, incorporating said adduct intimately into said vinyl polymer in ratios between about 5:95 and 80:20 of organoclay adduct to vinyl polymer, heat-fusing the mixture, and then subjecting said heat-fused mixture to high energy ionizing radiation at a dosage level between about 1 and 1,000 megarads to induce cross linkage between said organoclay adduct and said vinyl polymer.

2. A process as defined in claim 1 wherein said ionizing radiation consists predominantly of gamma rays.

3. A process as defined in claim 1 wherein said ionizing radiation consists predominantly of beta particles.

4. The method of claim 1 wherein said vinyl polymer is a hydrocarbon polyolefin.

5. A method for improving the solvent resistance of vinyl polymers which comprises contacting a hydrogen clay with an organic addend selected from the group consisting of polyvinyl alcohol and polyethylene oxide to form an organoclay adduct, intimately incorporating said organoclay adduct into said vinyl polymer in a ratio between about 5:95 and 80:20 of organoclay adduct to vinyl polymer, heat-fusing the mixture, and thereafter subjecting said heat-fused mixture to high energy ionizing radiation at a dosage between about 5 and 200 megarads.

6. The process of claim 5 wherein said clay is essentially hydrogen bentonite.

7. The process of claim 5 wherein said clay is essentially hydrogen montmorillonite.

8. A method for incorporating clay into a vinyl polymer which comprises forming an organoclay adduct by contacting a hydrogen clay with an organic addend selected from the group consisting of polyvinyl alcohol and polyethylene oxide, subjecting said organoclay adduct to high energy ionizing radiation at a dosage level between about 1 and 1,000 megarads so as to store radiation in said clay, then incorporating said adduct intimately into said vinyl polymer in ratios between about 5:95 and 80:20 of organoclay adduct to vinyl polymer, and heat-fusing the mixture at a temperature at least about 60° C. so as to release said stored irradiation and induce cross linkage between said organoclay adduct and said vinyl polymer.

9. A synthetic plastic composition comprising a vinyl polymer and intimately incorporated therein an adduct of a clay with an organic addend selected from the group consisting of polyvinyl alcohol and polyethylene oxide, said adduct being cross linked through methylene linkages to said vinyl polymer, and being characterized by improved solvent resistance as a result of said cross linking.

10. A composition as defined by claim 9 wherein said addend is polyvinyl alcohol, said vinyl polymer is polyethylene and said clay is montmorillonite.

11. A composition as defined by claim 9 wherein said addend is polyethylene oxide.

12. The composition of claim 9 wherein said vinyl polymer is a hydrocarbon polyolefin.

References Cited by the Examiner

UNITED STATES PATENTS

| 2,795,568 | 6/1957 | Ruehrwein | 260—41 |
| 2,865,882 | 12/1958 | Strassburg | 260—41.5 |
| 2,928,802 | 3/1960 | Rehner et al. | 260—41.5 |
| 2,952,595 | 9/1960 | Jordan et al. | 204—158.1 |
| 2,967,138 | 1/1961 | Serniuk et al. | 204—154 |
| 2,989,452 | 6/1961 | D'Alelio | 204—154 |
| 3,084,114 | 4/1963 | Gilbert et al. | 204—154 |
| 3,084,117 | 4/1963 | Nahin et al. | 204—154 |

FOREIGN PATENTS

| 447,243 | 3/1948 | Canada. |
| 820,168 | 9/1959 | Great Britain. |

MORRIS LIEBMAN, *Primary Examiner.*

DANIEL ARNOLD, *Examiner.*